United States Patent
Lynch (10) Patent No.: US 8,796,546 B2
(45) Date of Patent: *Aug. 5, 2014

(54) HIGH VOLTAGE CABLE AND INSULATOR SHIELD WITH FLEXIBLE ARM CONNECTOR

(71) Applicant: Eco Electrical Systems, Reno, NV (US)

(72) Inventor: Michael Lynch, Reno, NV (US)

(73) Assignee: Eco Electrical Systems, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,484

(22) Filed: Oct. 9, 2013

(65) Prior Publication Data

US 2014/0034380 A1    Feb. 6, 2014

Related U.S. Application Data

(63) Continuation-in-part of application No. 13/466,778, filed on May 8, 2012, now Pat. No. 8,618,412.

(51) Int. Cl.
*H01B 17/00*    (2006.01)
*H01B 17/56*    (2006.01)
*H02G 7/00*    (2006.01)

(52) U.S. Cl.
CPC ............... *H01B 17/00* (2013.01); *H02G 7/00* (2013.01); *H01B 17/56* (2013.01)
USPC ...... 174/5 R; 174/102 R; 174/382; 174/84 R; 439/578

(58) Field of Classification Search
USPC ...... 174/102 R, 15.5, 382, 5 R, 84 R; 439/578
See application file for complete search history.

(56) References Cited

U.S. PATENT DOCUMENTS

| 2,149,875 | A | * | 3/1939 | Talbott | 248/63 |
| 3,383,459 | A | * | 5/1968 | Short | 174/144 |
| 4,365,410 | A | * | 12/1982 | Houston et al. | 29/762 |
| 6,730,852 | B1 | * | 5/2004 | Puigcerver et al. | 174/138 F |
| 2006/0003622 | A1 | * | 1/2006 | Lynch | 439/404 |
| 2009/0188698 | A1 | * | 7/2009 | Cloutier et al. | 174/172 |
| 2010/0218988 | A1 | * | 9/2010 | Lynch | 174/5 R |
| 2010/0263302 | A1 | * | 10/2010 | Lynch | 52/101 |
| 2012/0220151 | A1 | * | 8/2012 | Gregory et al. | 439/346 |
| 2013/0055657 | A1 | * | 3/2013 | Parker | 52/101 |
| 2013/0299230 | A1 | * | 11/2013 | Lynch | 174/5 R |
| 2014/0083831 | A1 | * | 3/2014 | Gregory et al. | 200/48 R |

* cited by examiner

*Primary Examiner* — Robert J Hoffberg
*Assistant Examiner* — Michael Matey
(74) *Attorney, Agent, or Firm* — Patent Law Group LLP; Brian D Ogonowsky

(57) ABSTRACT

A plastic shield for a cable and insulator is described having a center section for covering the insulator. The center section has an opening at both its ends for the cable. Proximate each opening is a pivotable and bendable flange, where the flange pivots at one end of the flange and freely bends. An arm extends from each of the cable openings of the center section, and each arm covers the cable exiting the center section. Each arm is pivotally attached to the other end of the associated flange. The flange allows its associated arm to be moved over a wide range of horizontal and vertical angles (e.g., up to 45 degrees) and allows the arms to have a variable horizontal and vertical offset relative to the center line of the center section and insulator to accommodate a cable that is offset from the center line.

15 Claims, 8 Drawing Sheets

HIGH VOLTAGE CABLE AND INSULATOR SHIELD WITH FLEXIBLE ARM CONNECTOR

CROSS-REFERENCE TO RELATED APPLICATIONS

This is a continuation-in-part of U.S. patent application Ser. No. 13/466,778, filed on May 8, 2012, by Michael Lynch, incorporated herein by reference.

FIELD OF THE INVENTION

This invention relates to a shield for a high voltage cable and its supporting insulator to prevent shorting by wildlife and trees, and, in particular, to a shield that adapts to any angle and asymmetry of the cable bending around the insulator.

BACKGROUND

It is common to support medium to high voltage (e.g., greater than 2K volts) cables on wooden poles supported by ceramic insulators. Frequently, there are three parallel cables, each carrying a different phase. If there is a short to ground or a short between cables, a fuse or breaker will trip, causing a power outage or a rerouting of the electricity. A lineman must then fix the problem and reset the fuse/breaker.

Figure 1:
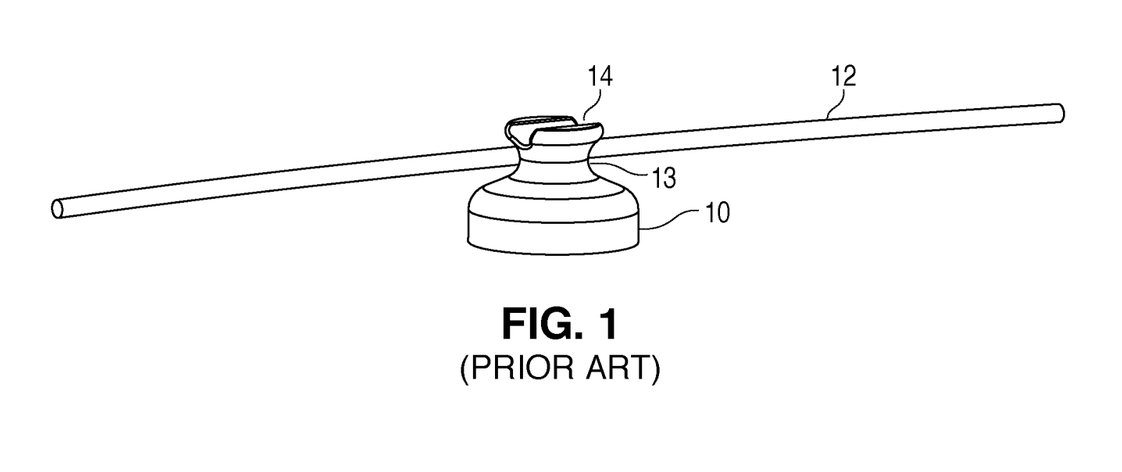
FIG. 1 is a perspective view of a prior art insulator and cable.
Figure 2:
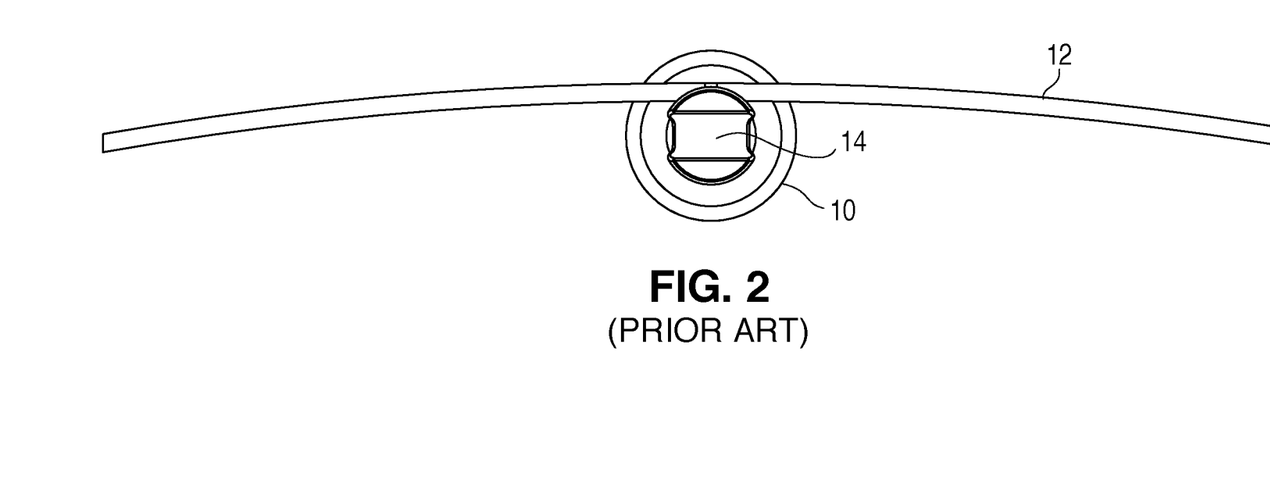

FIG. 1 is a perspective view of a conventional ceramic insulator 10 that is mounted on a wooden pole (not shown) using conventional hardware, such as a bracket or a bolt. Round insulators are typically 4-8 inches in diameter. A bare cable 12 is secured to the insulator 10 by a wire (not shown) twisted around the insulator neck 13 and the cable 12. FIG. 2 is a top down view of the insulator 10 and cable 12. For three phase distribution, there are typically two insulators/cables at the ends of a wooden cross-arm and one insulator/cable supported in the middle or on the top of the pole.

When there is a straight run of the cable 12, the cable 12 may be supported by the indent 14 at the top of the insulator 10 or may be tied to the side of the neck 13. A twist wire keeps the cable 12 in place. When the cable path needs to change direction, the cable 12 is bent around the neck 13 of the insulator 10, as shown in FIGS. 1 and 2. If the cable 12 is supported by the indent 14, for a straight run, the structure is symmetrical. If the cable 12 is tied to the side of the neck 13, as shown in FIGS. 1 and 2, the structure is asymmetrical.

In locations where there are trees, large birds, other animals, or the voltage is particularly high, cable shields are sometimes used to prevent arcing by a tree or an animal when the tree or animal contacts two or more of the phased cables. It is common to only put the shield over the center insulator/cable. Such shields are formed of a plastic, which may be resilient or rigid.

Shields that simply cover a straight cable 12 supported by the top indent 14 of the insulator 10 are simple and adequate, since the insulator/cable structure is symmetrical.

Shields are known that have two arms extending from a wide central portion of the shield that covers the ceramic insulator, where the arms cover the cable extending in both directions. The shield is formed of a soft, resilient plastic, and the arms can bend at different angles relative to the central portion. One such shield is the Tyco Electronics Corporation BCIC-G-PIN-795 raptor guard, whose arms flex up to 30 degrees.

One problem with the BCIC-G-PIN-795 shield is that it assumes the cable 12 is supported symmetrically at the center of the insulator 10 within the indent 14. However, if the cable 12 is bent around the neck 13 of the insulator 10, the insulator/cable is not symmetrical, and the shield will not properly fit over the insulator 10 and cable 12. As a result, the resilient shield material will be angled and distorted. This reduces the effectiveness of the shield and is not aesthetically pleasing. An angled shield opens up the underside of the shield to the wind, placing a large strain on the shield.

What is needed is a universal shield for cables supported by insulators, where the shield precisely adapts, without any distortion, to the asymmetrical arrangement of a cable 12 bent around the neck 13 of the insulator 10, as well as when the cable 12 is supported by the indent 14 at the top of the insulator 10.

SUMMARY

A plastic shield for a cable and insulator is described comprising a center section for covering the insulator. Two arms extend from the center section and each is attached to the center section by a respective pivoting flange. The flange has a first pivoting connection point at one end and a second pivoting connection point at its other end. The first pivoting connection point is attached to the center section, and the second pivoting connection point is attached to one of the arms. The length of the flange will typically be about 2-3 inches. The flange allows its associated arm to be moved over a wide range of lateral angles (e.g., up to 45 degrees) to accommodate a bend in the cable. To accommodate a cable that is laterally offset from the center of the insulator when the cable is tied to the side of the insulator's neck, the flange, by pivoting around the arm, adds a lateral offset up to 3 inches for each arm. The length of the flange is set to accommodate the offset between the center of the insulator to the center of the cable when the cable is tied to the side of the neck of the insulator. The flange may have any suitable length (e.g., 2-4 inches), depending on the maximum size of the insulator.

In another embodiment, the flange is additionally bendable in the Z-axis direction. Accordingly, not only can the cable be offset in the horizontal (lateral) direction with respect to the center line of the insulator (by the above-described pivoting feature), but the cable can be at variable distances above or below the center line of the insulator while not imposing any stresses on the structure. Therefore, the arms and center section of the shield are optimally connected over the cables and insulator irrespective of any vertical or horizontal offset of the cable with respect to the insulator. Since such offsets are frequently unpredictable until the lineman secures the cable to the insulator, the flexibility of the present invention satisfies an important need in the field. The flange may be bendable by being formed of an easily flexible material, or the flange may have one or two hinges along its length that allow it to accommodate the vertical offset. The flange is thus pivotable and bendable.

Another unique aspect of the shield is that each arm comprises a short arm adaptor, that connects to the flange located within the center section of the shield, and an arm extension that fits over the portion of the arm adaptor that extends beyond the center section. Any length arm extension may be fitted over the arm adaptor. The small size of the arm adaptor makes it is easy to manipulate when connecting it, via the flange, to the center section. Also, the arm adaptor may be formed of a more rigid material than the arm extension, and the arm extension can be selected to have different lengths.

The arm adaptor has a flared end (toward the ceramic insulator) to prevent water dripping on the cable. The arm adaptor has vertical ribs, and the arm extension has vertical grooves that receive the ribs as the arm extension is brought down into position over the arm adaptor. The molded grooves form protruding ribs on the outside of the arm extension that divert water to prevent the water entering the center section.

Holes are provided along the shield for receiving plastic pins that are inserted using a hot stick. The pins prevent the shield being lifted off the cable and insulator. Each hole may optionally have a cowl over it to prevent the pins being used as a bird perch.

Other features of the shield are also described.

BRIEF DESCRIPTION OF THE DRAWINGS

Fig. is a top down view of FIG. 1.

FIGS. 7-12 are semi-transparent top down views of the shield, where the cable is at different angles and different offsets from the center line.

Elements labeled with the same numerals may be identical or similar.

DETAILED DESCRIPTION

The invention is a shield or cover for an insulator supporting a cable carrying medium or high voltages, where the insulator is supported by a utility pole or tower. The shield will typically be a molded plastic material such as a slightly resilient PVC or HDPE. The shield prevents arcing caused by large birds, animals, or trees bridging the gap between cables carrying different phases or between a cable and ground. The cables may be run laterally spaced from each other run vertically spaced from each other.

Figure 3:
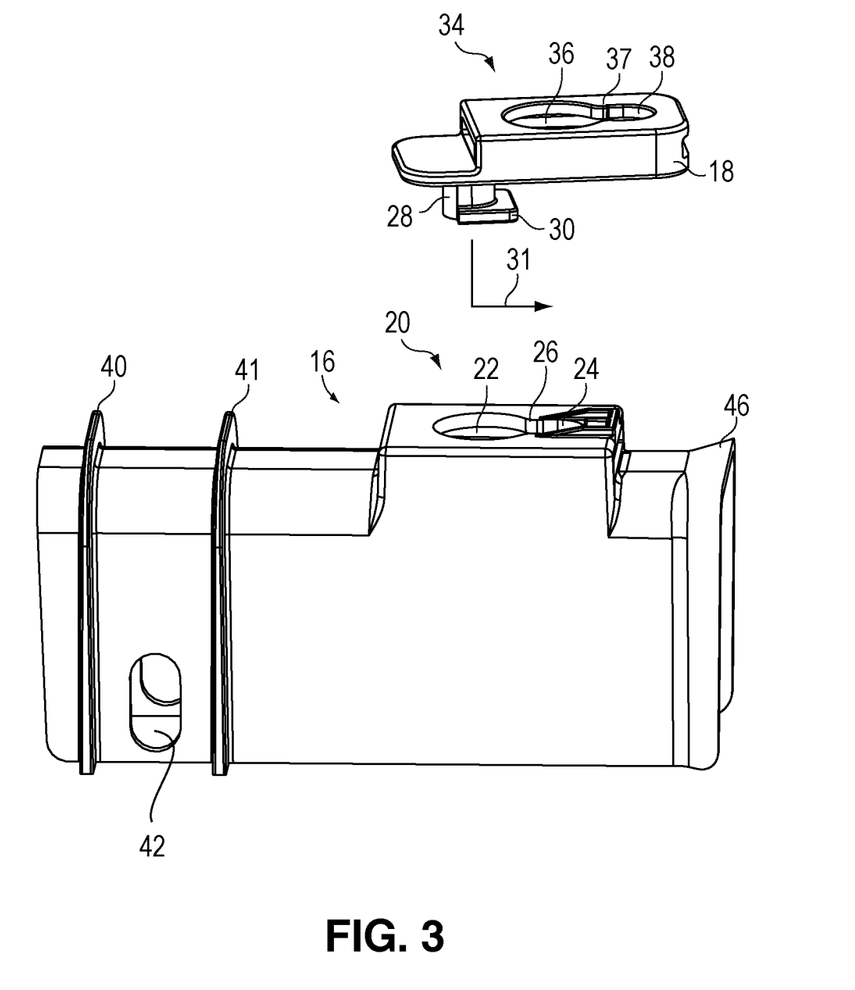
FIG. 3 is an exploded perspective view of the arm adaptor and flange.
Figure 4:
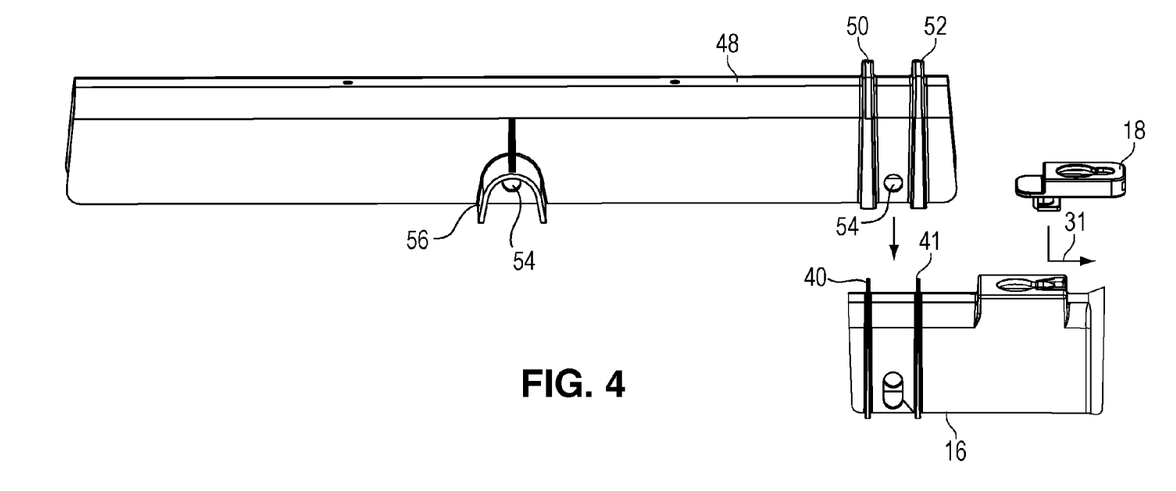
FIG. 4 is a perspective view of the arm extension being connected to the arm adaptor.
Figure 5:
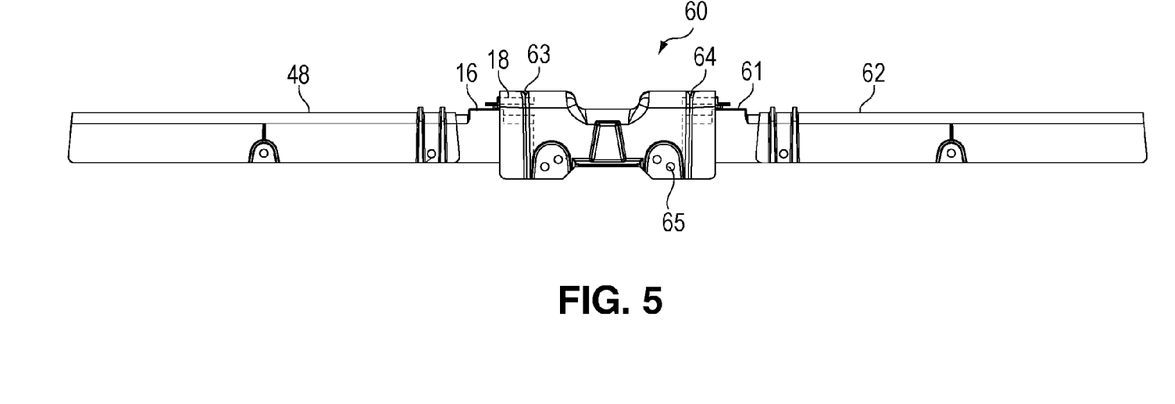
FIG. 5 is a semi-transparent side view of the completed shield in a straight configuration, with the arm adaptor being connected to the center section solely by the pivoting flange.

FIGS. 3-5 illustrate the four connectable pieces of the shield.

FIG. 3 illustrates and arm adaptor 16 and a flange 18. The arm adaptor 16 is formed to have a U-shape to cover the cable. The top portion of the arm adaptor 16 has a keyhole 20 comprising a wide hole 22, a small hole 24, and a constrictor 26 that is slightly narrower than the hole 24. In one embodiment, the wide hole 22 is about 0.5 to 0.75 inches in diameter, and the small hole 24 is slightly less than half the diameter of the wide hole 22.

The flange 18 includes a bottom, cylindrical connector 28 having a flat bottom extension 30. The connector 28 and extension 30 fit through the wide hole 22 in the arm adaptor 16, and the flange 18 is then forced backward (as shown by arrow 31) to cause the connector 28 (or constrictor 26) to slightly deform when passing through the constrictor 26. When the connector 28 is positioned within the small hole 24, the connector 28 is effectively locked into the hole 24 and can pivot freely. The extension 30 prevents the flange 18 from being released vertically through the small hole 24. The arm adaptor 16 material and flange 18 material are selected to have a suitable resiliency to allow the locking to occur. The flange's 18 movement will be substantially restricted to only pivoting (rather than tilting) due to the extension 30 and flange 18 bottom surface abutting the bottom and top surfaces, respectively, of the shelf surrounding the small hole 24.

The flange 18 has an identical keyhole 34, having a wide hole 36, constrictor 37, and small hole 38 for attachment to a connector and extension within a center section of the shield (described later) that are identical to the connector 28 and extension 30 described above.

The arm adaptor 16 has protruding vertical ribs 40 and 41 for being inserted in corresponding grooves in an arm extension. A hole 42 is formed in the arm adaptor 16 for receiving a pin. The hole 42 is elongated to allow some misalignment between the arm adaptor 16 and the arm extension.

The arm adaptor 16 has a flared end 46 (toward the ceramic insulator) to prevent water dripping on the cable.

FIG. 4 illustrates the arm extension 48 being aligned with the arm adaptor 16 for fitting them together. The molded ribs 50 and 52 on the arm extension 48 form grooves inside the arm extension 48 for receiving the ribs 40 and 41 on the arm adaptor 16. The heights of the arm extension 48 and arm adaptor 16 may be on the order of 3-6 inches, and their widths may be on the order of 1-2 inches to accommodate a cable.

The ribs 50 and 52 additionally block water travelling along the arm extension 48 toward the cable or insulator.

The arm extension 48 includes holes 54 for receiving a pin that extends below the cable for preventing the shield coming off the cable. One hole 54 is shown having a cowl 56 over it to prevent birds from using the pin as a perch. The hole 54 between the ribs 50 and 52 may optionally have a cowl.

Figure 6:
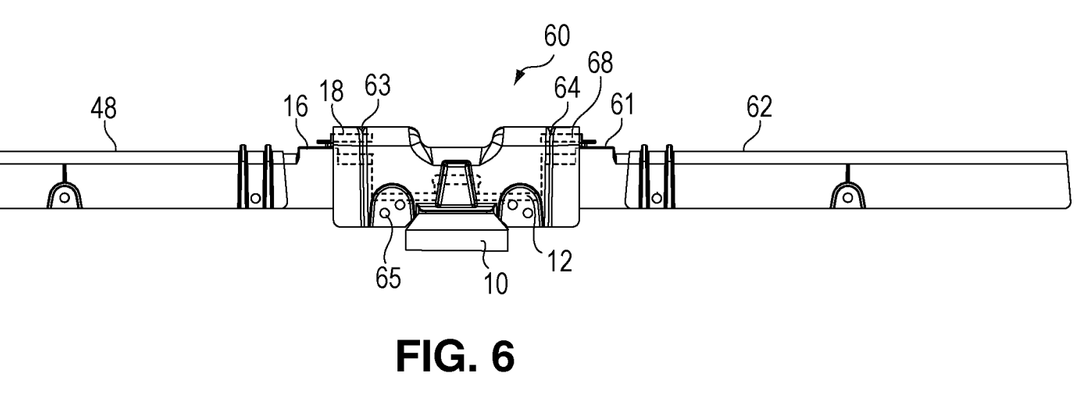
FIG. 6 illustrates the shield of FIG. 5 positioned over an insulator and a cable.

FIG. 5 shows the center section 60 that has a center cavity which receives the neck 13 (FIG. 1) of the insulator 10. FIG. 6 illustrates the shield covering the insulator 10 and cable 12. The insulator 10 is connected to a utility pole or tower. The arm adaptors 16 and 61 are identical, and the arm extensions 48 and 62 are identical.

Near the openings of the center section 60 are down-extending cylindrical connectors 63 and 64, each with a flat bottom extension (obscured in FIG. 5), that are identical to the connector 28 (FIG. 3) and extension 30 of the flange 18. All features of each part (e.g., 16, 18, 60, 48) are molded so that each part is a single piece. The flange top keyhole 34 (FIG. 3) is snapped into the connector 63 so that the connector 63 pivots in the small hole 38 in the flange 18. This allows the arm adaptor 16 to pivot around the flange connector 28 and move laterally (for offset) with respect to the center section 60. Holes 65 in the center section 60 receive pins that extend under the cable 12 for securing the center section 60 over the insulator 10.

Figure 7:
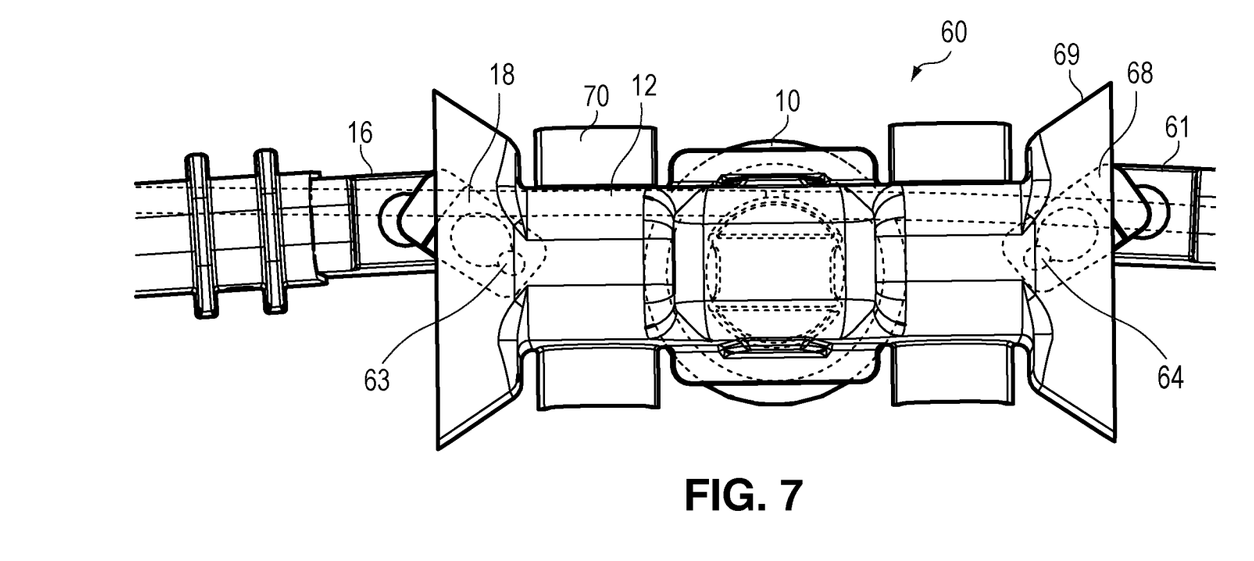
FIG. 7 illustrates the shield, where the cable is slightly bent around the neck (upper part of neck in FIG. 7) of the insulator, causing both arms to be offset (upward in FIG. 7) to accommodate the asymmetry of the insulator/cable.

FIG. 7 is a top down view of the shield covering the insulator 10 and cable 12. The center section 60 has a center line (not shown) bisecting it along its length. The cable 12 is wire-tied to the side of the insulator 10 neck which, in FIG. 7, is the upper side of the neck. The cable 12 is slightly bent. Since the cable 12 is not symmetrical with the insulator 10, the arm adaptors 16 and 61 are offset (pivoted with respect to flanges 18 and 68) to accommodate the asymmetry and are angled to accommodate the slight bend in the cable 12. Note how the flanges 18 and 68 are not in-line with either the center section 60 or the arm adaptors 16 and 61. If the opening to the arm adaptor 16 or 61 does not align with the center line bisecting the center section 60 (due to the flange pivoting with respect to the arm adaptor), the arm adaptor is considered to be offset. In other words, the flanges 18 and 68 allow the arm adaptors to have a lateral offset relative to the center line of the center section 60 and insulator 10 to accommodate a cable 12 that is offset from the center line.

The center section 60 has flared openings 69 to allow side to side movement of the arm adaptors 16 and 61. Cowls 70 are shown over the pin holes 65.

Figure 8:
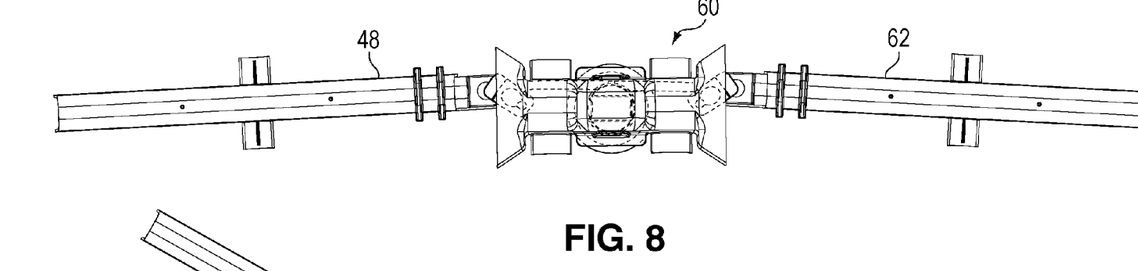
FIG. 8 is a wider view of the shield of FIG. 7 showing the arm extensions.

FIG. 8 is a widened view of FIG. 7 to show the arm extensions 48 and 62.

In FIGS. 9-12, the insulator 10 and cable 12 are not shown for simplicity.

Figure 9:
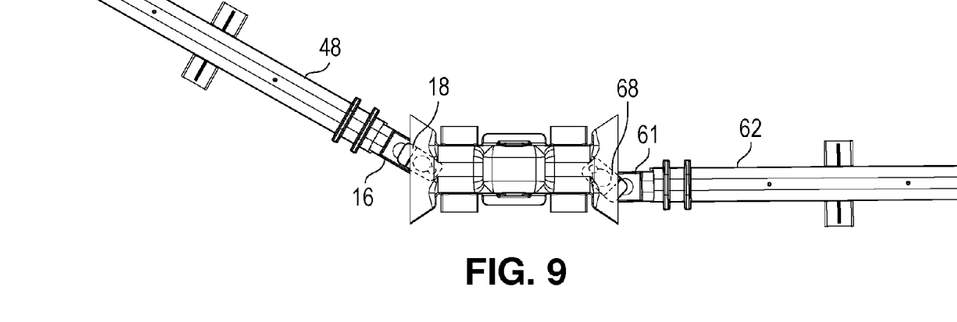
FIG. 9 illustrates the shield, where the cable runs straight from the right and is bent around the neck (bottom part of neck in FIG. 9) of the insulator, causing one arm to be straight and offset and the other arm to be angled and not offset.

FIG. 9 illustrates the shield, where the cable runs straight from the right and is bent around the neck of the insulator, which is the bottom of the neck in the top view of FIG. 9, causing the arm extension 62 to be straight and offset (by the arm adaptor 61 pivoting around the flange 68), and the arm extension 48 to be angled but not offset (no pivoting of the arm adaptor 16 around the flange 18).

Figure 10:
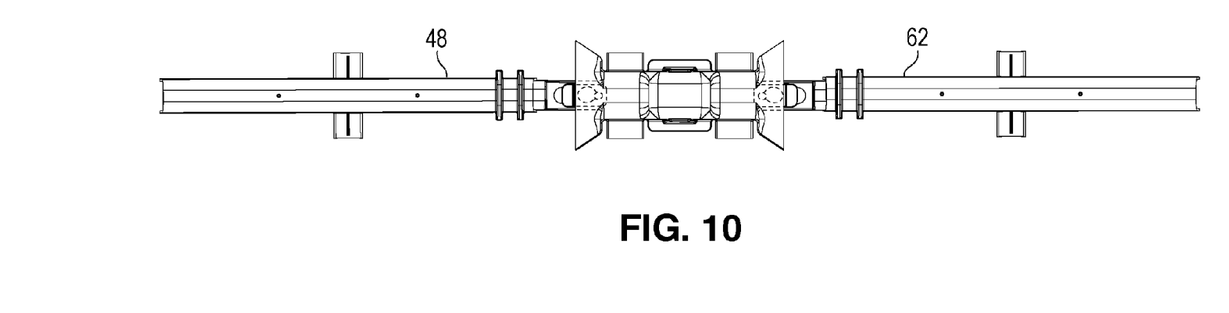
FIG. 10 illustrates the shield, where the cable is supported by the indent in the top of the insulator and running straight, causing the shield's arms to be straight and not offset.

FIG. 10 illustrates the shield, where the cable is supported by the indent 14 (FIG. 1) in the top of the insulator 10 and runs straight (creating a symmetrical structure), causing the shield's arm extensions 48 and 62 to be straight and not offset (no pivoting around the flanges).

Figure 11:
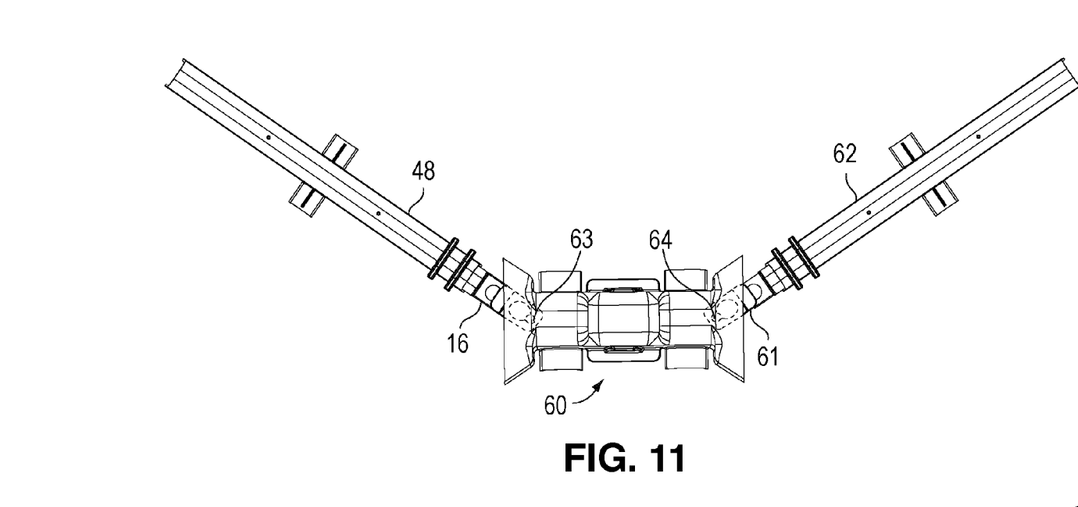
FIG. 11 illustrates the shield, where the cable is bent around the neck (the bottom part of the neck in FIG. 11) of the insulator, causing both arms to be angled and not offset due to the particular angle.

FIG. 11 illustrates the shield, where the cable is bent around the neck of the insulator, which is the bottom part of the neck in the top view of FIG. 11, causing both arm extensions 48 and 62 to be angled. Due to the large bend, the arm adaptors 16 and 61 are not offset (i.e., the cable approximately passes directly under the cylindrical connectors 63 and 64 on the center support 60).

Figure 12:
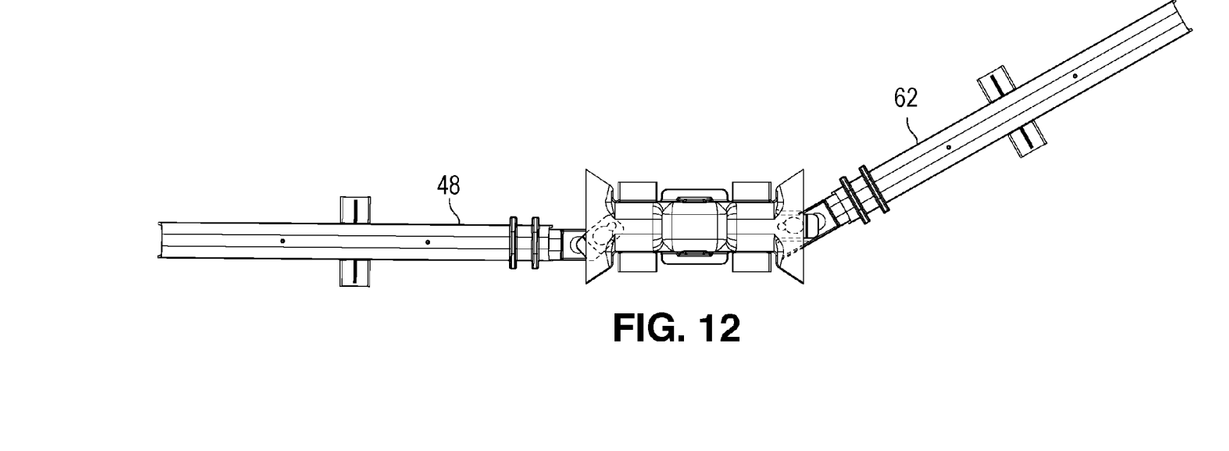
FIG. 12 illustrates the shield, where the cable runs straight from the left side and is bent around the neck (the bottom part of the neck in FIG. 12) of the insulator, causing one arm to be straight and offset and the other arm to be angled and offset.

FIG. 12 illustrates the shield, where the cable runs straight from the left side and is bent around the neck of the insulator, which is the bottom part of the neck in the top view of FIG. 12, causing the arm extension 48 to be straight and offset and the arm extension 62 to be angled and offset.

Figure 13A:
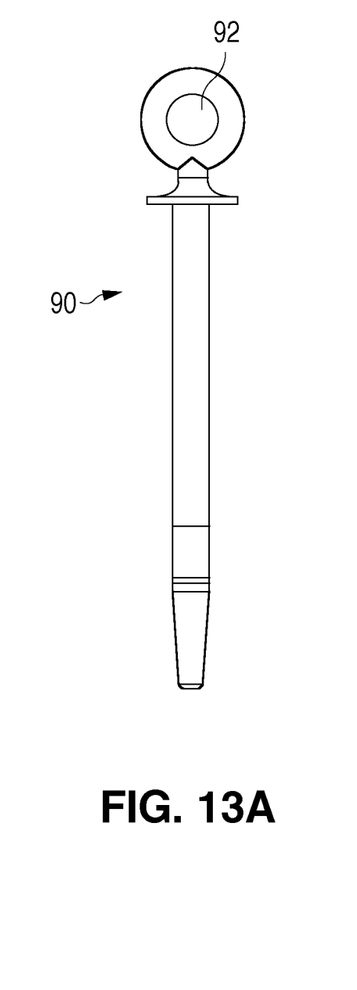
FIG. 13A is a front view of a pin that may be used to secure the shield over the insulator and cable.
Figure 13B:
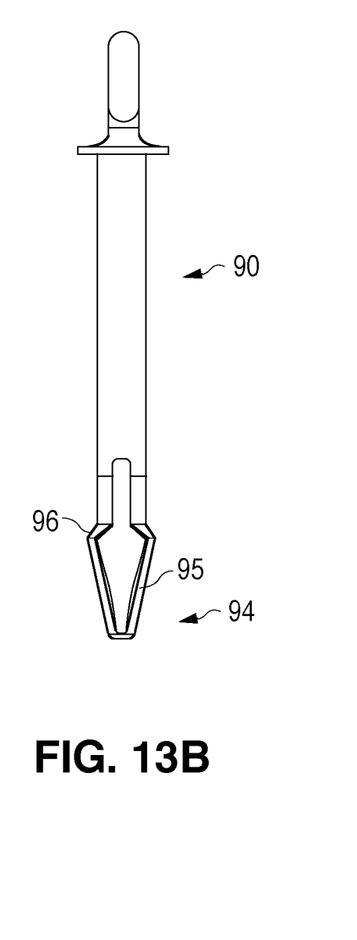
FIG. 13B is a side view of the pin of FIG. 13A.

FIG. 13A is a front view of a plastic retaining pin 90 that may be used to secure the shield over the insulator 10 and cable 12. FIG. 13B is a side view of the pin 90 of FIG. 13A. The pin 90 may be 3-4 inches long, sufficient to pass through both opposing holes along the shield's length below the cable 12 to prevent the shield from coming off the cable and insulator.

The end of the pin 90 has a round grasping hole 92 for grasping by a hook of a hot stick.

The nose 94 has a relatively long front portion 95 that expands out from the tip at about a 15 degree angle. The nose 94 has an opening to allow the nose to be compressed when passing through a hole slightly larger than the shaft of the pin 90. The shallow angle and long nose allow the pin 90 to be pushed through the holes in the shields using a relatively low pushing force to compress the nose 94. The back part 96 of the nose is relatively short and has a relatively steep angle of about 45 degrees, so as to require a higher pulling force to compress the nose when removing the pin from the hole. This ensures that the pin 90 will not be inadvertently pulled out of the hole during high winds. In one embodiment, the insertion force is about three pounds, and the removal force is about six pounds. It is much easier to pull on a pin with a long hot stick, so the increased pulling force is not a problem for the lineman.

Many variations of the flange 18, arm adaptor 16, arm extension 48, and center section 60 may be used while still achieving the offset of the arms with respect to the center section. In another embodiment, the arm adaptor and arm extension are an integral piece.

In some applications, there may be a variety of vertical offsets of the cable with respect to the insulator. For example, in FIG. 1, there may be a variety of insulators used in a distribution system with different heights so that the vertical distance between the cable 12 and the top of the insulator 10 may be different. In prior art systems, to accommodate these variabilities, the lineman would have to deform the shield or affix it to the insulator and cable in ways not intended by the manufacturer, thus reducing its effectiveness. Also, the lineman may connect the cable 12 to the insulator 10 so that the alignment of the cable 12 to the insulator 10 is variable. Therefore, it would be desirable to also allow for the cable 12 to have a variable vertical position with respect to the center line of the insulator while still allowing the shield to be optimally positioned over both the cable and the insulator. In that way, only a single type of adjustable shield could be used with a wide variety of combinations of cables, insulators, and connections.

To achieve this additional feature, the flange 18 (FIGS. 3 and 4) can be replaced with a flange that is bendable in the Z-axis direction. Accordingly, not only can the cable be offset in the horizontal (lateral) direction with respect to the center line of the insulator (by the above-described pivoting feature), but the cable can be at variable distances along the vertical direction with respect to the center line of the insulator while not affecting the connection of the center section 60 of the shield over the insulator.

Figure 14:
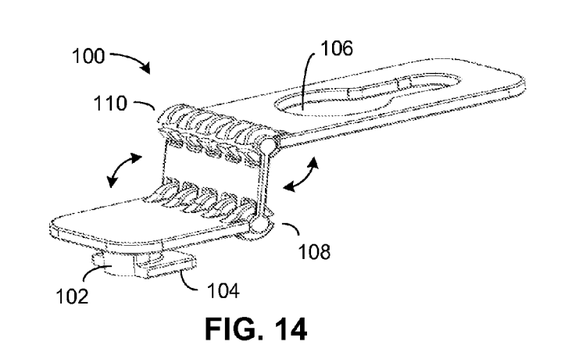
FIG. 14 is a perspective view of a flange that can pivot in the lateral direction and also bend in the vertical direction. The flange has a keyhole and a key for fast snap-in installation.

FIG. 14 is a perspective view of a plastic flange 100 that can be used instead of the flange 18 of FIGS. 3 and 4 in the various shield embodiments. For illustration purposes, the flange 100 is bent at its maximum angle for the maximum Z-axis offset. FIG. 14 shows the connector 102 and extension 104 at one end, which may be identical to the connector 28 and extension 30 in FIG. 3 so as to fit in the keyhole in the arm adaptor 16 formed by the openings 22, 24, and 26 in FIG. 3. The flange 100 also has the same keyhole connector 106 as the flange 18 in FIG. 3 for being pivotally secured to the center section 60 (FIG. 5). Since the arm extension 48 (FIG. 4) is connected to the arm adaptor 16, the vertical offset of the arm extension 48 with respect to the center section 60 is also variable.

The flange 100 has two hinges 108 and 110 that allow the flange 10 end connectors to be in two different vertical planes to allow the center section 60 and arm adaptor 16 to have a variable offset, depending on the location of the cable with respect to the insulator. The three sections of the flange 100 may be molded separately and then snapped together. The material may be a resilient PVC or other plastic.

Accordingly, the flange 100 can freely pivot in the lateral direction and bend in the vertical direction.

Figure 15:
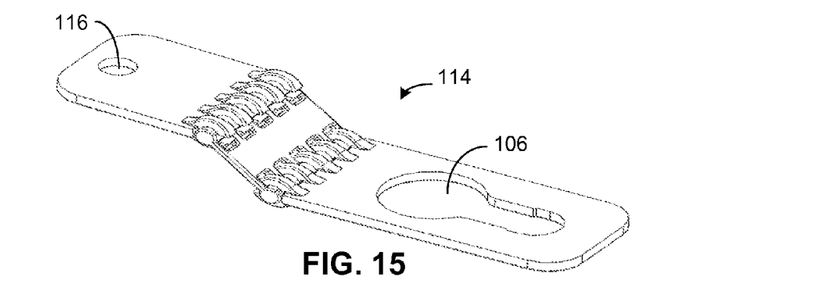
FIG. 15 is a perspective view of a variation of the flange of FIG. 14 where the pivoting connection to the center section or arm adaptor uses a bolt, while the pivoting connection to the other portion of the shield uses a snap-in keyhole connector for easy assembly in the field.

FIG. 15 is a perspective view of a bendable flange 114 that is a variation of the flange 100 of FIG. 14. In flange 114, one end of the flange 114 is connected to either the central section 60 or the arm adaptor 16 by a bolt, or other type of axis pin, through the hole 116 that loosely secures the flange 14 to that portion of the shield. Such a bolt may be installed in the factory. The center section 60 or arm adaptor 16 then includes threads or another hole for receiving the bolt or other type of axis pin. The other end of the flange 106 has a snap-in connector, such as the keyhole 106 that allows the arm adaptor 16 to be connected to (or disconnected from) the center section 60 in the field, if required.

Features other than a hinge may be used to allow the flange to bend to provide a vertical offset.

Figure 16:
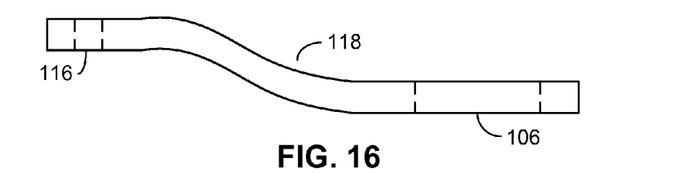
FIG. 16 is a side view of a bendable flange made of an easily bendable material.

To provide the bendability of the flange, the flange may instead be formed of a very flexible (resilient) material, such as shown FIG. 15 and FIG. 16, which is a side view of a suitable flange 118 that is being arbitrarily bent. Suitable flexible plastics and rubber materials are known.

The flange 114 may be pivotally connected to the arm adaptor 16 and center section 60 using any of the methods described above. In the example, a bolt hole 116 and keyhole 106 are shown by dashed lines.

Figure 17:
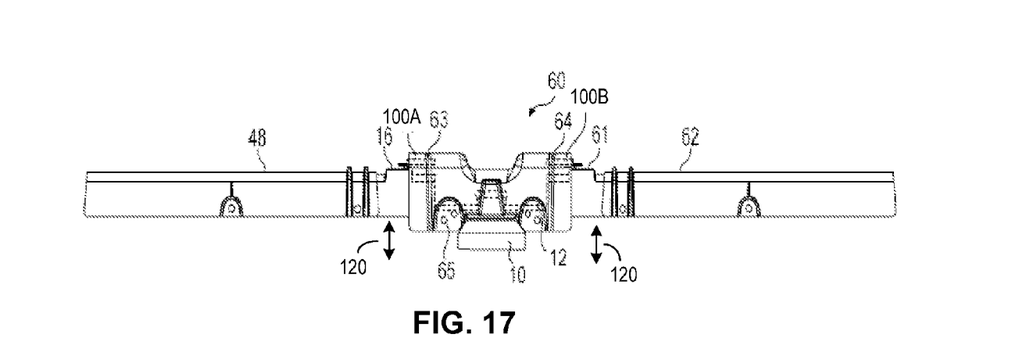
FIG. 17 is similar to FIG. 6 but the flange of FIGS. 3 and 4 is replaced by one of the bendable flanges of FIGS. 14-16 to allow variability in the Z-direction between the arm adaptor and the center section.

FIG. 17 is similar to FIG. 6 but the flange 18 of FIGS. 3 and 4 is replaced by one of the bendable flanges of FIGS. 14, 15, and 16 to allow variability in the Z-direction (arrows 120) between the arm adaptor 16 and the center section 60. In other words, the arm adaptor 16 can be variably offset from the center line of the center section 60 in all directions with substantially no stressed placed on any elements in the structure. In the example of FIG. 17, the flange 100 is used and labeled 100A and 100B. The length of the flange will typically be about 2-3 inches to allow up to about 2 inches of offset from the center line in all directions.

In some applications, the insulator is near a terminus of the cable, and the cable only extends in one direction from the insulator. In such a case, only a single arm extension 48 and arm adaptor 16 is needed.

By using the bendable flange, the arm extensions 48 and center section 60 of the shield are optimally connected over the cables and insulator irrespective of any vertical or horizontal offset of the cable with respect to the insulator. Since such offsets are frequently unpredictable until the lineman secures the cable to the insulator, the flexibility of the present invention satisfies an important need in the field.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A shield for an insulator and cable carrying a voltage, the insulator supporting the cable, the shield comprising:

a center section configured to cover at least a portion of the insulator, the center section having a first pivot feature proximate to a first opening of the center section, the center section having a center line bisecting it along its length;

a first arm having a second pivot feature, the first arm having a second opening for the cable; and a first flange having a third pivot feature engaging the first pivot feature of the center section such that the first flange is pivotable around the first pivot feature in at least a lateral direction, the first flange having a fourth pivot feature engaging the second pivot feature on the first arm such that the first flange is pivotable around the second pivot feature in at least the lateral direction, the first flange enabling the second opening of the first arm to be offset from the center line of the center section by the first flange pivoting with respect to the second pivot feature of the first arm, wherein the first flange is bendable, enabling the first arm to be offset from the center line of the center section in a vertical direction perpendicular to the lateral direction.

2. The shield of claim 1 further comprising a second arm extending from a third opening in the center section, the second arm being connected to the center section by a second flange that is pivotable and bendable with respect to the second arm and center section.

3. The shield of claim 2 wherein the first flange is identical to the second flange.

4. The shield of claim 3 wherein the center section has flared openings for the first arm and the second arm to accommodate a range of angles of the first arm and the second arm.

5. The shield of claim 3 wherein the center section, first arm, and second arm are formed of a plastic that does not substantially bend during use.

6. The shield of claim 1 further comprising the cable and the insulator, the center section being affixed over the insulator, and the first arm being affixed over the cable.

7. The shield of claim 1 wherein the first arm has a range of movement of over 30 degrees when pivotally coupled to the center section.

8. The shield of claim 1 wherein the shield is affixed to the insulator and the cable, wherein the cable is bent around the insulator, and wherein the first arm is at an angle with the center line of the center section.

9. The shield of claim 1 wherein the first flange has a first length dimension between the third pivot feature and the fourth pivot feature such that the first arm can be offset from the center line of the center section.

10. The shield of claim 1 wherein the first flange includes at least one hinge to allow it to be bendable.

11. The shield of claim 10 wherein the first flange includes two hinges to allow it to be bendable.

12. The shield of claim 1 wherein the first flange is formed of a flexible material that allows the first flange to be offset from the center line of the center section in a vertical direction perpendicular to the lateral direction.

13. The shield of claim 1 wherein at least one of the third pivot feature and the fourth pivot feature comprises an axis pin inserted through a hole in the first flange.

14. The shield of claim 1 wherein at least one of the third pivot feature and the fourth pivot feature comprises a keyhole for connection to a keyed connector for pivoting around the keyed connector.

15. The shield of claim 1 wherein at least one of the third pivot feature and the fourth pivot feature comprises a tools-free snap-in connector.

* * * * *